(12) United States Patent
Huang

(10) Patent No.: US 8,601,710 B2
(45) Date of Patent: Dec. 10, 2013

(54) STRUCTURAL IMPROVEMENT OF HOOK PIECE OF A MEASURING TAPE DEVICE

(75) Inventor: Jason Huang, Taipei (TW)

(73) Assignee: Index Measuring Tape Co., Ltd., Taipei (TW)

( * ) Notice: Subject to any disclaimer, the term of this patent is extended or adjusted under 35 U.S.C. 154(b) by 78 days.

(21) Appl. No.: 13/469,288

(22) Filed: May 11, 2012

(65) Prior Publication Data

US 2013/0298417 A1  Nov. 14, 2013

(51) Int. Cl.
*G01B 3/08*  (2006.01)

(52) U.S. Cl.
USPC .................................. 33/758; 33/768; 33/770

(58) Field of Classification Search
USPC ............. 33/758, 768, 770, 759, 760, DIG. 21
See application file for complete search history.

(56) References Cited

U.S. PATENT DOCUMENTS

| | | | | |
|---|---|---|---|---|
| 2,663,941 | A * | 12/1953 | Dart | 33/768 |
| 4,827,622 | A * | 5/1989 | Makar | 33/770 |
| 5,481,813 | A * | 1/1996 | Templeton | 33/758 |
| 7,669,347 | B1 * | 3/2010 | Huang | 33/758 |
| D668,977 | S * | 10/2012 | Huang | D10/74 |
| 8,375,595 | B2 * | 2/2013 | Murray et al. | 33/758 |
| 2010/0050456 | A1 * | 3/2010 | Huang | 33/770 |
| 2010/0236086 | A1 * | 9/2010 | Huang | 33/770 |
| 2012/0073155 | A1 * | 3/2012 | Mabey | 33/770 |

* cited by examiner

*Primary Examiner* — Yaritza Guadalupe-McCall
(74) *Attorney, Agent, or Firm* — Bacon & Thomas, PLLC

(57) ABSTRACT

A measuring tape device has a hook piece consisting of a hook plate and a pulling plate to be connected into a L-shaped structure; the edges of the hook plate are formed with an U-shaped extruded holder for holding an anti-slip piece, said pulling plate has a hollow area, a magnetic base to be screwed onto the tape is put on said pulling plate with a convex bottom portion held by said hollow area and then the magnetic base is attached to the upper surface of said pulling plate, such that said pulling plate can be moved forward and backward along the bottom surface portions surround said convex portion of said magnetic base. Besides, there is a box formed on said magnetic base for safely holding a magnetic element.

9 Claims, 6 Drawing Sheets

STRUCTURAL IMPROVEMENT OF HOOK PIECE OF A MEASURING TAPE DEVICE

BACKGROUND OF THE INVENTION

1. Field of the Invention

The present invention relates to an improvement of measuring tape device, in particular, it refers to the hook piece that is designed to prevent the hook piece from slipping off from the object to be measured.

2. Description of Prior Art

With the increasing demand of surveying, the measuring tape devices get to be more widely used. A conventional measuring tape device 1, as shown in FIG. 1, comprises of a casing 11; a hollow space (not shown) is formed within the casing, which holds a bobbin (not shown); at the center of the casing 11 is the bobbin that is connected to the casing 11 with a coil spring (not shown). A measuring tape 12 having scales is contained inside the casing 11, one end of the measuring tape 12 is connected to the spring and it is wound around the bobbin, and the other end of the tape 12 extends outside of the casing 11 through an aperture. A hook piece 13 is attached at the end of the measuring tape.

During the process of taking measurement, the hook plate 14 of the hook piece 13 is attached to an object and then the measuring tape 12 is pulled away from outside of the casing 11, then the extended tape 12 is locked in place using the device's locking mechanism 16, and the measure can be read from the scales printed on the tape 12, as such, the length of the object to be measured or distance from the object is obtained.

Because the hook piece 13 of said conventional measuring tape device can measure the length or distance of an object by hooking, when the object has a large volume or the distance is longer than usual, it is difficult for the hook piece 13 to fix onto the object and then the measuring accuracy can not be obtained.

In order to improve said problem happened in conventional measuring tape device, U.S. Pat. No. 6,546,644B2 discloses a measuring tape device having a measuring tape with concaved upper surface, such that the measuring tape can be horizontally supported when it is extended outward from the casing, and a magnet is attached to the end of the hook piece, so as to fix the end of measuring tape onto an object to be measured.

US Patent Publication No. 2004/0064962A1 discloses a soft hook piece for measuring tape device having a soft housing enveloping the hook piece, in measuring an object, by the function of soft housing, the hook piece can firmly hook onto the object to be measured. In addition, a magnetic element is also adhered onto the surface of said hook piece.

Although the above disclosed improved arts had improved the disadvantages of conventional measuring tape device, however, since the magnetic element is adhered directly onto the surface of hook piece, it causes the magnetic element to be easily come apart from the surface of hook piece after the measuring tape is used extensively. In addition, because the hook piece is fixed onto the measuring tape and can not be moved, the accuracy of measuring shall be reduced due to the thickness or installment of magnetic element.

SUMMARY OF THE INVENTION

The main objective of present invention is to provide structural improvement for hook piece of a measuring tape device, which can be forward and backward moved on the measuring tape.

According to the structural improvement for hook piece of a measuring tape device of present invention, not only that the anti-slip piece does not easily come apart from the hook piece, but the hook piece also has a hollow area, such that a magnetic base on the upper surface of the hook piece can be firmly installed onto the measuring tape, and therefore the hook piece can be forward and backward moved on the measuring tape, this is the other objective of present invention.

To accomplish the above objectives, the hook piece of present invention consists of a hook plate installed with an anti-slip piece, and a connecting plate; the hook plate has a primary surface, there are three slightly extruded edges surrounding the primary surface and these edges are perpendicular to the primary surface, thus a space is formed for holding the anti-slip piece; at the upper end of the hook plate, the connecting plate extends and is perpendicular to the hook plate, and the anti-slip piece of the hook plate is adhered onto the primary surface of the hook plate; the slightly extruded edges surrounding the primary surface give boundary and resistance to the movement of the anti-slip piece, such that it prevent the anti-slip piece from coming apart from the primary surface of the hook plate.

In practical application, it is beneficial to make the anti-slip piece to be higher than said surrounding edges. Therefore, during measuring process, the anti-slip piece of the hook plate can be used to hold onto the surface of the object to be measured without said edges come in direct contact with the surface of the object to be measured. This strengthens the grip of hook plate when it is used to hold onto the object of measure.

According to the structural improvement of hook piece of a measuring tape device of present invention, a magnetic piece is installed into said magnetic base and would not com apart from the magnetic base even after a long timed uses. This is another object of the present invention.

According to the structural improvement of hook piece of a measuring tape device of present invention, the front end surface of said magnetic piece is on the same line with the "0" scale printed on the measuring tape, and, the hook piece can be moved forward and backward, so as to meet an object to be measured by using either the front end surface of connection plate or the back surface of the anti-slip piece, wherein, the back surface of the anti-slip piece and the front end surface of said magnetic piece is on the same line with the "0" scale printed on the measuring tape, this is a further object of present invention.

A more complete understanding of these and other features and ill become advantages of the present invention will become apparent from a careful consideration of the following detailed description of certain embodiments illustrated in the accompanying drawing.

DETAILED DESCRIPTION OF THE PREFERRED EMBODIMENTS

Figure 1:
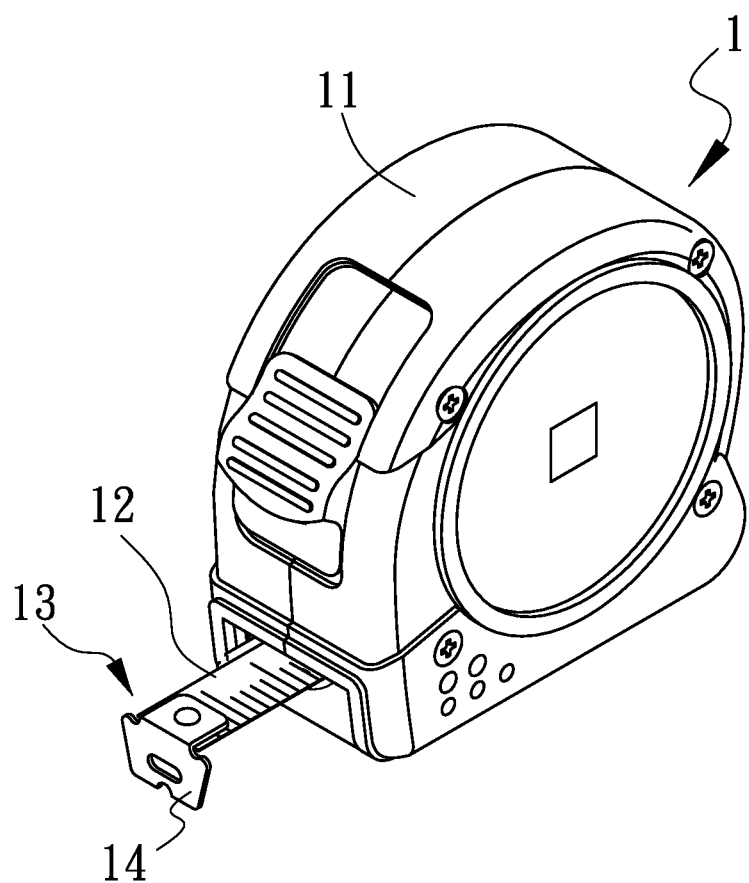
FIG. 1 is an illustrative view showing a conventional measuring tape device.
Figure 2:
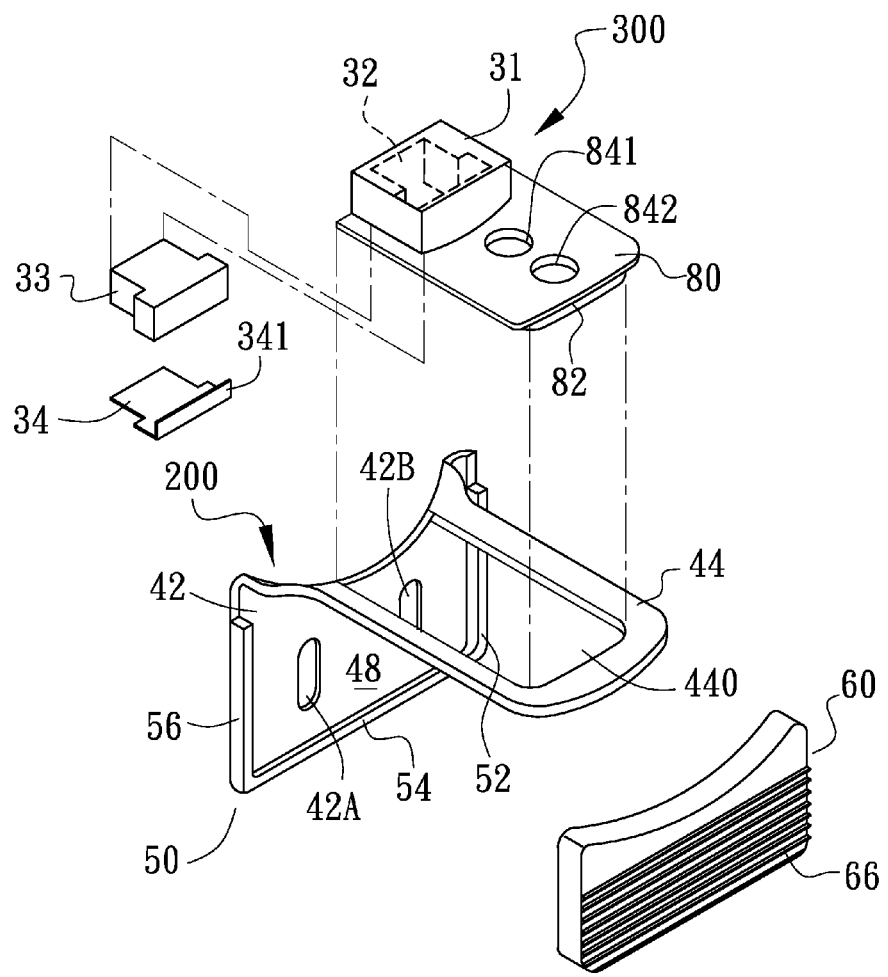
FIG. 2 is an exploded perspective view showing the construction of the hook piece and the magnetic base of present invention.
Figure 3:
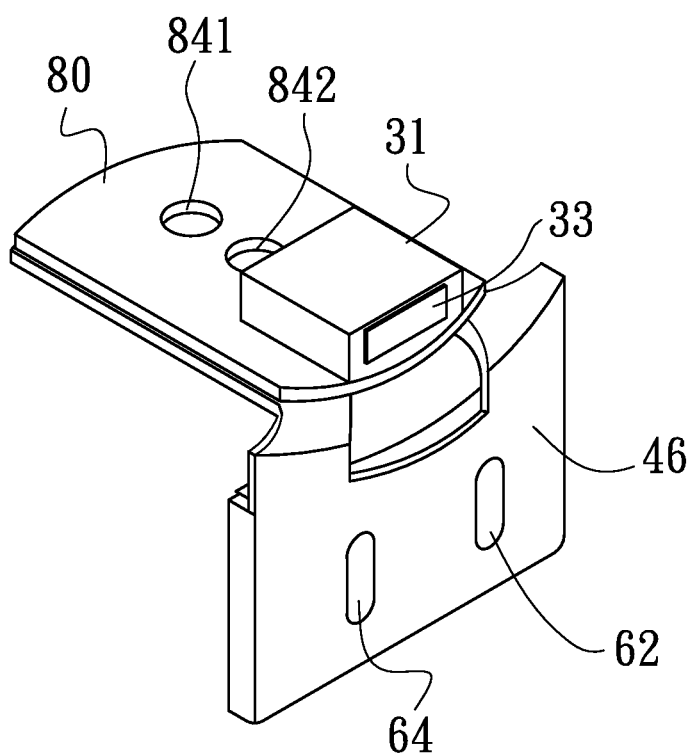
FIG. 3 is a perspective view showing the combination of the hook piece and the magnetic base of present invention.

The structural improvement of hook piece of a measuring tape device of present invention is as shown in FIGS. 2 & 3, the subject hook piece 200 consists of a hook plate 42, and a pulling plate 44, wherein the hook plate 42 has a first surface 46 and a second surface 48 opposed to the first surface 46. The side edges of said second surface 48 are formed with backward extended first stop wall 52, second stop wall 54 and third stop wall 56. Said first stop wall 52, second stop wall 54 and third stop wall 56 form an U-shaped extruded stopper 50 for holding an anti-slip piece 60, on the hook plate 42, a plurality of holes 42A, 42B are formed, and a plurality of extrudes 62, 64 corresponding to said holes 42A, 42B are formed on a surface of said anti-slip piece 60. By the above described structure, when the anti-slip piece 60 is installed to the back side of said hook plate 42, the anti-slip piece 60 shall be firmly fixed onto the back surface of the hook plate 42 not only held by said U-shaped stopper 50, but also by inserting the extrudes 62, 64 into the holes 42A, 42B formed in the hook plate 42.

In addition, the surface of said anti-slip piece 60 is formed with a plurality of extrude lines 66, such that the friction force between the anti-slip piece 60 and the object to be measured is increased.

As shown in said drawings, said pulling plate 44 is perpendicular to the hook plate 42, and one end of pulling plate 44 is in connection with the upper end of the hook plate 42. The control part of said pulling plate 44 is formed with a hollow area 440.

Figure 4:
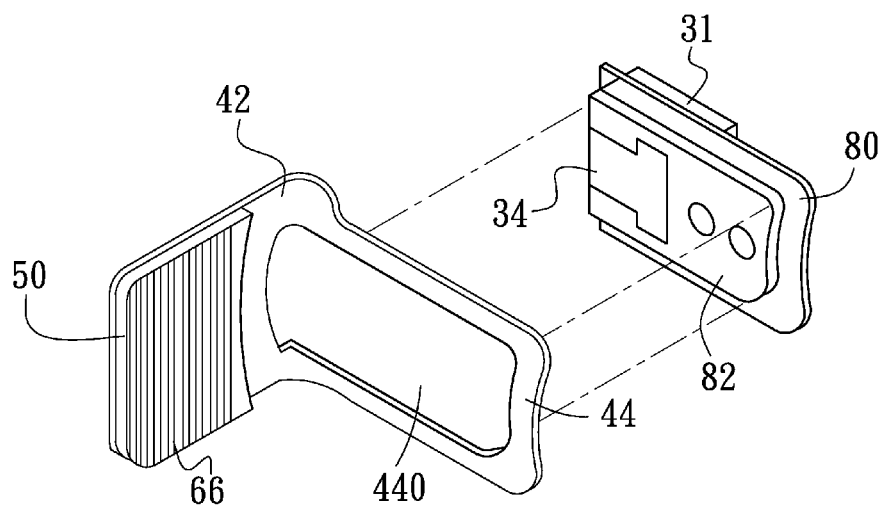
FIG. 4 is a separated perspective view showing the three-dimensional construction of the hook piece and the magnetic base of present invention before combination.
Figure 5:
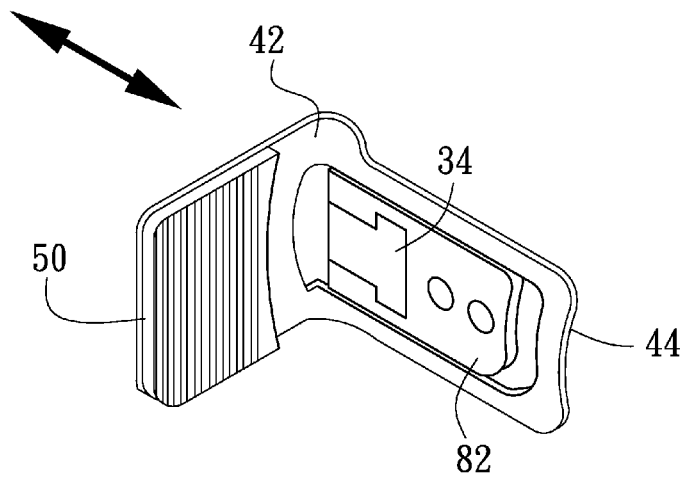
FIG. 5 is a three-dimensional perspective view showing the hook piece of present invention having the function of moving forward and backward after combination with the magnetic base.

Please refer to FIGS. 4 & 5, there is a magnetic base 30 on the hook piece 200, the bottom plate 80 of the magnetic base 300 has an area about the same as the pulling plate 44. The lower surface of said bottom plate 80 of magnetic base 300 is formed with a convex portion 82 having an area smaller than the hollow area 440 of said pulling plate 44. Then the convex portion 82 of said magnetic base 300 shall be exposed in the hollow area 440 of said pulling plate 44.

In addition, there are screw holes 841, 842 formed in penetrating through the bottom plate 80 together with the convex portion 82 of said magnetic base 300. Then the magnetic base 300 can be attached to the upper surface of pulling plate 44 by the bottom plate 80, and let the convex portion 82 of the bottom plate 80 be exposed in said hollow area 440 of the pulling plate 44. After the magnetic base 300 is firmly fixed onto the measuring tape by rivets, the pulling plate 44 is clamped between the measuring tape and said magnetic base 300, the hook piece 200 then can be moved forward and backward along the convex portion 82 of the magnetic base 300.

As shown in FIGS. 4 & 5, on the front upper end of the magnetic base 300, there is a holder 31, a holding space 32 having an opening is formed inside the holder 31. A magnetic element 33 is put inside the holding space 32. After the magnetic element 33 is put into the holding space 32, a cover plate 34 having extrusion plate 341 which can be mounted into the gap between the magnetic element and holding space 32, is put onto the holding space 32 for firmly keeping the magnetic element 33 inside the holding space 32.

The above described holding space 32 can be formed as T-shaped, or another shape of wide inside and narrow outside (such as L-shape, cone-shape etc.), it is acceptable only if a magnetic element can be kept inside it very long time and the magnetic element can have the function of absorbing an external object. Therefore, magnetic element can be formed in T-shape or another shape corresponding to the shape of said holding space 32 and in addition, the magnetic element can be firmly held inside the holding space 32 by means of adherence, screwing, clamping, squeezing etc.

Figure 6A:
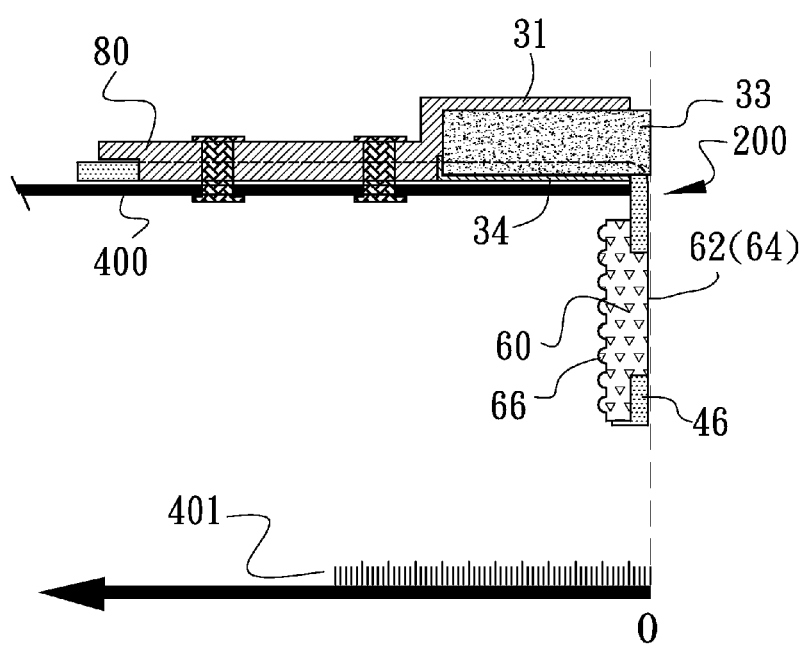
FIGS. 6A & 6B are illustrative views showing the functions of present invention.

As shown in FIG. 6A, in practical uses of present invention, if the object to be measured is made of metal or the end to be measured had metal material, the hook piece 200 can be attached to the object by using magnetic element 33 to absorb the object to be measured. If the object to be measured is made of a material other than metal, then the first surface 46 of said hook plate 42 can be used to hold against the object to be measured. Since the front end of magnetic element 33 and the first surface 46 of said hook plate 42 are positioned at the "0" point of scale 401 printed on the measuring tape 400, therefore, either by using magnetic element 33 or the hook plate 42 to hold against the object to be measured, the precise measurement can be achieved.

Figure 6B:
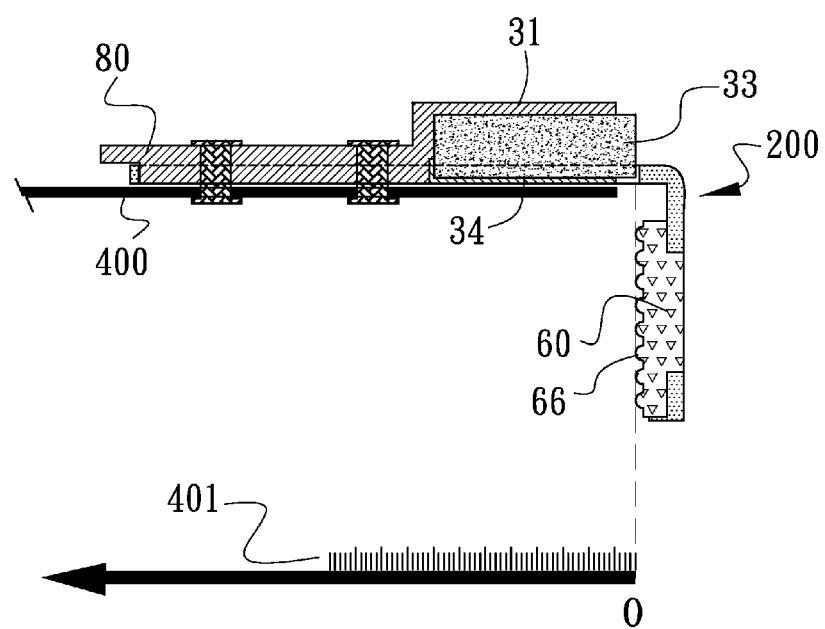

It is noticed that the pulling plate 44 of hook piece 200 is movably formed between the magnetic base 300 and the measuring tape 400, and then the hook piece 200 can be moved forward and backward on the measuring tape. Thus, if it is necessary to measure an object by hooking, it can be performed as shown in FIG. 6B, the anti-slip piece 60 adhered to the inner side surface of the hook plate 42 is attached to the object to be measured, and by the extrude lines 66 formed on the anti-slip piece 60, the friction between the anti-slip piece 60 and the object to be measured is increased, then the measuring tape can firmly hook the object, so as to perform the measuring of the length or distance of an object.

The above demonstration is only a preferred embodiment, there can be numerous variations in practice, for example, the edges may be limited to only the second side and the forth side; the distance between the upper part of the edge and the surface of the pulling part may be varied; the thickness of the anti-slip piece may be varied, etc., the above variations do not avert the accomplishment of the objectives of present invention.

It is to be emphasized that present invention is not limited to the embodiments described in the above examples, variations such as changing shape of the pulling part of the hook plate; changing number of extruded edges on the sides of the pulling part; changing material used for the anti-slip piece, etc., may be made without causing departure from the spirit of present invention.

What is claimed is:

1. A structural improvement of hook piece of a measuring tape device, the hook piece consists of a hook plate and a pulling plate, the pulling plate has a hollow area and a magnetic base having a convex bottom portion to be put on said pulling plate with said convex bottom portion held by said hollow area, then said magnetic base is attached to the upper surface of said pulling plate; said magnetic base is firmly fixed onto the measuring tape, such that the hook piece can be moved forward and backward for precise measuring.

2. A structural improvement of hook piece of a measuring tape device as claimed in claim 1, wherein on the upper end of said magnetic base attached to the upper surface of said pulling plate has a holder having a holding space for firmly holding a magnetic element.

3. A structural improvement of hook piece of a measuring tape device as claimed in claim 2, wherein the holding space of said holder is formed in T-shape, so as to the magnetic element to be hold inside the holder.

4. A structural improvement of hook piece of a measuring tape device as claimed in claim 2, wherein a cover plate is put onto the holding space of said holder for firmly keeping the magnetic element inside said holding space of said holder.

5. A structural improvement of hook piece of a measuring tape device as claimed in claim 2, wherein the magnetic element is firmly held inside said holing space by means of adherence, screwing, clamping, squeezing etc.

6. A structural improvement of hook piece of a measuring tape device as claimed in claim 2, wherein the front end surface of said magnetic element inside said holder of said magnetic base is positioned at the scale "0" printed on the measuring tape.

7. A structural improvement of hook piece of a measuring tape device as claimed in claim 1, wherein the hook plate has a first surface and a second surface opposed to the first surface; the side surfaces of said second surface are formed with backward extruded stop walls to form a U-shaped stopper for holding an anti-slip piece.

8. A structural improvement of hook piece of a measuring tape device as claimed in claim 7, wherein a plurality of holes are formed on said hook plate and a plurality of extrudes corresponding to said holes are formed on a surface of said anti-slip piece, such that said anti-slip piece can be held not only by said U-shape stopper, but also by inserting said extrudes formed on said hook plate into said holes formed on said anti-slip piece.

9. A structural improvement of hook piece of a measuring tape device as claimed in claim 7, wherein on the surface without extrudes of said anti-slip piece, a plurality of extrude lines are formed, such that the friction between said anti-slip piece and an object is increased.

* * * * *